US006644346B1

(12) United States Patent
Conrads et al.

(10) Patent No.: US 6,644,346 B1
(45) Date of Patent: Nov. 11, 2003

(54) SPRING-LOADED TANDEM CONTROL VALVE

(75) Inventors: Hermann-Josef Conrads, Herzogenaurach (DE); Erwin Laurer, Möhrendorf (DE); Jürgen Model, Erlangen (DE)

(73) Assignee: Framatome ANP GmbH, Erlangen (DE)

( * ) Notice: Subject to any disclaimer, the term of this patent is extended or adjusted under 35 U.S.C. 154(b) by 0 days.

(21) Appl. No.: 09/687,971

(22) Filed: Oct. 16, 2000

Related U.S. Application Data (63) Continuation of application No. PCT/DE99/01024, filed on Apr. 6, 1999.

(51) Int. Cl.[7] .............................................. F16K 17/10
(52) U.S. Cl. ..................... 137/491; 137/489; 137/492.5; 251/26; 251/29
(58) Field of Search ............................... 137/488, 489, 137/491, 492.5; 251/26, 29, 33

(56) References Cited

U.S. PATENT DOCUMENTS

| 2,619,109 | A |   | 11/1952 | Garrett et al. |         |
|-----------|---|---|---------|----------------|---------|
| 3,298,390 | A | * | 1/1967  | De Graff ..................... | 251/29 |
| 4,402,341 | A | * | 9/1983  | Reip ........................... | 137/489 |
| 4,672,995 | A | * | 6/1987  | Powell ........................ | 137/489 |
| 4,977,925 | A | * | 12/1990 | Tiefenthaler ............. | 137/489.5 |
| 5,590,684 | A | * | 1/1997  | Alberts et al. ............. | 137/489 |
| 6,386,228 | B2 | * | 5/2002 | Conrads et al. ............. | 137/488 |

FOREIGN PATENT DOCUMENTS

| DE | 455 133       | 1/1928 |
| DE | 39 06 888 A1  | 9/1990 |
| DE | 44 26 857 A1  | 2/1996 |

OTHER PUBLICATIONS

International Search Report for corresponding International Application PCT/DE 99/01024; Sep. 7, 1999.*

* cited by examiner

*Primary Examiner*—Michael Powell Buiz
*Assistant Examiner*—Ramesh Krishnamurthy
(74) *Attorney, Agent, or Firm*—Laurence A. Greenberg; Werner H. Stemer; Ralph E. Locher (57) ABSTRACT

The fitting, in particular a safety valve, operates according to the relief principle or according to the loading principle. The fitting is opened and closed by a plurality of pilot parts. The pilot parts are connected in series in the control line of the fitting and are each actuated by a pilot valve. The pilot parts open the fitting only when all the pilot parts are in a position which opens the fitting. The fitting closes as soon as even only one of the pilot parts is in a position which closes the fitting.

8 Claims, 6 Drawing Sheets

SPRING-LOADED TANDEM CONTROL VALVE

CROSS-REFERENCE TO RELATED APPLICATION

This is a continuation of International Application PCT/DE99/01024, filed Apr. 6, 1999, which designated the United States.

BACKGROUND OF THE INVENTION

1. Field of the Invention

The invention relates to an assembly comprising a fitting and a pilot device having at least two spring-loaded pilot valves which each actuate a dedicated pilot part, for opening the fitting which is opened by pressure relief by means of a control line.

These are fittings which are actuated by their own medium, preferably safety valves for reducing undesirable excess pressures in pressure lines or pressure vessels. The fittings which are actuated by their own medium are opened by a pilot valve when a critical pressure is reached in a pressure vessel or a pressure line and should be closed by the same pilot valve when the pressure falls below a critical level. The pilot valves are spring-loaded. The preferred application area for fittings which are controlled by their own medium in this way is in the primary circuit of nuclear power plants, in particular pressurized-water reactors.

Spring-loaded pilot valves per se are sufficiently well known in the prior at and are already supplied for these purposes by various companies. A safety valve of this type is known, for example, from German patent DE 455 133. In a pilot valve arrangement which operates on the relief principle, the system pressure (pressure in the pressure vessel) operates against a spring and an additional magnetic load and opens a pre-control pilot valve, downstream of which a nonreturn valve is arranged. As a result, a valve disc of this nonreturn valve is lifted counter to the force of a further spring and lifts a nonreturn valve cone out of its valve seat; as a result, the control line of a pressure-vessel safety valve is opened and the pressure in the control volume of the safety valve is relieved. The safety valve opens. It closes again when the system pressure has fallen sufficiently far for the pre-controlled pilot valve and the nonreturn valve to close.

The valve arrangement of a second manufacturer operates on the loading principle. It essentially comprises only a valve with spring and magnetic load (similar to the above-mentioned pilot valve) and—as soon as a setpoint has been reached—passes a mass flow out of the pressure vessel into the control line, which leads to the control volume of the safety valve and presses it open.

The pilot valve produced by a third manufacturer actuates a plurality of valve bodies which are connected to one another and which are used both to pressurize the control volume of the safety valve (closure of the safety valve) and to relieve the pressure on this control volume (opening).

Spring-loaded pilot valves have a relatively high probability, which does not correspond to that of the main fitting, of failing to close. The inability of a spring-loaded pilot valve to close is $10^{-2}$/demand, i.e. the probability is that the valve will fail to close once in only 100 demands. By contrast, the probability that the main fitting will fail to close is $10^{-4}$/demand. However, the relatively high probability that the pilot valve will fail to close means that the low probability of the main fitting failing to close has no effect.

Even with a relatively recent internal development of a pilot valve, the probability of the valve failing to close is still not entirely satisfactory. In this device, a pressure-displacement converter is connected to a pilot valve, the pressure-displacement converter being mechanically connected to a filling cone and to a relief cone, and both cones being moved in the same direction. In a first step, the filling cone can be moved onto a seat by a relatively low force, with the result that a pilot line of the pilot valve is blocked. In a second step, only a relatively high force is able to lift the relief cone off its seat, with the result that the control line of the pilot part is connected to a line which is open to atmosphere and the pressure on the safety valve is relieved (i.e. the safety valve is opened).

Theoretical calculations revealed that the probability of pilot valves failing to close can be reduced by connecting a combination of these pilot valves in series. By way of example, connecting two valves in series would lead to a probability of $(10^{-2})^2$/demand, i.e. of $10^{-4}$ per demand, of failure to close. A closure failure probability of this level is very similar to the closure failure probability of the main fitting.

Motor driven pilot valves which are connected in series are known in the prior art. They are in some cases also used in combination with a primary circuit safety valve. However, since these motor driven pilot valves operate on the open circuit principle, according to the relevant safety regulations they should not be used on their own. For example, German Regulations TRD 421 state that if there are three safety valves protecting a pressure vessel, only one safety valve may have pilot valves which operate on the open circuit principle. The other two safety valves which are present must have pilot devices which operate on the closed circuit principle.

The only known series-connected pilot valves which operate on the closed circuit principle are solenoid valves. However, these valves cannot be used in the primary circuit of a nuclear power plant, since they may open in the event of a voltage loss.

Known spring-loaded pilot valves, as described in the introduction, for example, cannot be connected in series on account of their design. For this reason, spring-loaded pilot valves are currently generally only used in single pilot valve arrangements in the primary circuit, i.e. even if a plurality of valves are provided, ultimately only a single pilot part which applies or relieves the load on the safety valve is present in the control line of the safety valve. The relatively high probability of the valve failing to close is accepted as inevitable.

2. Summary of the Invention

The object of the invention is to provide a spring-loaded tandem pilot valve which overcomes the above-noted deficiencies and disadvantages of the prior art devices and methods of this kind, and which specifies a pilot device for a fitting which, although it may contain loading springs, nevertheless leads to a low probability of the fitting failing to close.

With the above and other objects in view there is provided, in accordance with the invention, an assembly, comprising:

a fitting communicating with a control line and being opened by pressure relief via the control line;

a pilot device having at least two spring-loaded pilot valves each actuating a dedicated pilot part, for opening the fitting by pressure relief via the control line;

wherein the pilot parts are arranged at the control line and are configured to open the fitting only when all the pilot parts are in a position in which the load on the fitting is relieved, and the pilot parts closing the fitting as soon as a single one of the pilot parts is in a position imposing a load on the fitting.

In an alternative embodiment, there is provided, in accordance with the invention, an assembly, comprising:

a fitting communicating with a control line and being opened by pressure imposed via the control line;

a pilot device having at least two spring-loaded pilot valves each actuating a dedicated pilot part, for opening the fitting by pressure imposed via the control line;

wherein the pilot parts are arranged at the control line and are configured to open the fitting only when all the pilot parts are in a position in which a load is imposed on the fitting, and the pilot parts closing the fitting as soon as a single one of the pilot parts is in a position relieving the load on the fitting.

In other words, the invention specifies a pilot device by means of which a fitting, in order to be opened, can either be relieved or loaded by means of a control line, i.e. the fitting can operate either according to the relief principle or according to the loading principle. The pilot device may also operate without additional electromagnetic or other loads.

To achieve the above and other objects of the invention, the pilot device has at least two spring-loaded pilot valves as well as the same number of pilot parts. Each of the pilot parts is assigned to one of the pilot valves and is connected thereto. According to the invention, the pilot parts are arranged on the control line. A fitting operating on the relief principle opens when, and only when, all of the pilot parts are in a position in which the load on the fitting is relieved. The fitting closes as soon as even only one of the pilot parts is in a situation in which load is applied to the fitting. If the fitting is operating according to the loading principle, it opens when, and only when, the pilot parts are in a position in which they apply a load to the fitting and closes again as soon as even only one of the pilot parts is in a position in which it relieves the load on the fitting.

The invention works on the basis that the probability of the fitting failing to close is reduced in accordance with the rise in number of independently operating pilot parts when each pilot part on its own closes the fitting. A combination of independently acting pilot parts therefore enables the probability of the fitting failing to close to be improved considerably. For example, the combination of two pilot parts with a closure failure probability of in each case $10^{-2}$/demand results in an overall closure failure probability of $(10^{-2})^2$/demand, i.e. of $10^{-4}$ per demand. As a result, the failure closure probability of the fitting also corresponds to that of the combined pilot parts.

The pilot parts advantageously contain valves which are actuated by the associated pilot valves and are connected in series in the control line of the fitting. In this case, each of the pilot parts has a first port (the "control port" which is connected to the associated pilot valve via a control passage) and two further ports ("working ports", by means of which the pilot part is integrated into the control line of the fitting). Therefore, a working port of each pilot part is connected to the fitting either directly (for example via a feed line) or via one or more pilot parts (i.e. indirectly). Therefore, only a single pilot part is directly connected to the fitting via a working port, while the other working port of this pilot part is connected to a working port of another pilot part. This arrangement is referred to as a "series connection" or a "tandem valve", since a pressure medium coming from the fitting or flowing toward the fitting successively passes through a plurality of the pilot parts.

Furthermore, it is considered advantageous that the respective pilot valves and/or pilot parts are of the same design. This restricts fabrication and stock to a few components and makes construction and assembly easier.

In accordance with an added feature of the invention, at least one of the pilot valves of the pilot device has a pressure-displacement converter. This pressure-displacement converter, a filling cone and relief cone are arranged in such a manner that they interact mechanically with one another (at least in some positions are for example, connected to one another) and can be displaced simultaneously in the same direction. In a first chamber, the filling cone is arranged in such a manner that it can be displaced onto a valve seat ("filling cone seat") by a relatively low force. It is used to block off or open a pressure-carrying connection line, which opens out into the first chamber, with respect to a control passage, which connects this first chamber to the pilot part. The relief cone is arranged in a second chamber and can be lifted off a corresponding valve seat ("relief cone seat") by a relatively great force. As a result of the relief cone being lifted off its seat, a connection is produced between the passage which leads from the pilot part to the first chamber and the volume above the first seat, on the one hand, and a pilot valve drain (e.g. an outlet line which is open to atmosphere) on the other hand.

In accordance with a particularly advantageous feature of the invention, at least one of the pilot valves of the pilot device is designed as proposed in the copending German application 196 28 610.7-12. In this case, the pressure-displacement converter together with the filling cone and the relief cone is arranged on a common central axis. The arrangement is designed in such a way that filling cone and relief cone can be mechanically connected to the pressure-displacement converter and can be displaced in the same direction as the converter (i.e., for example, simultaneously).

The pressure-displacement converter is particularly advantageously provided with a plunger. At its lower end, this plunger is connected to the pressure-displacement converter. The upper end of the plunger is situated beneath and in the immediate vicinity of the relief cone. It can be displaced in such a way that, when suitably displaced, it touches the underside of the relief cone. The plunger is guided in an extension of the filling cone. The second chamber having the seat of the relief cone is situated in the interior of the filling cone.

Other features which are considered as characteristic for the invention are set forth in the appended claims.

Although the invention is illustrated and described herein as embodied in a spring-loaded tandem control valve, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE PREFERRED EMBODIMENTS

Figure 1:
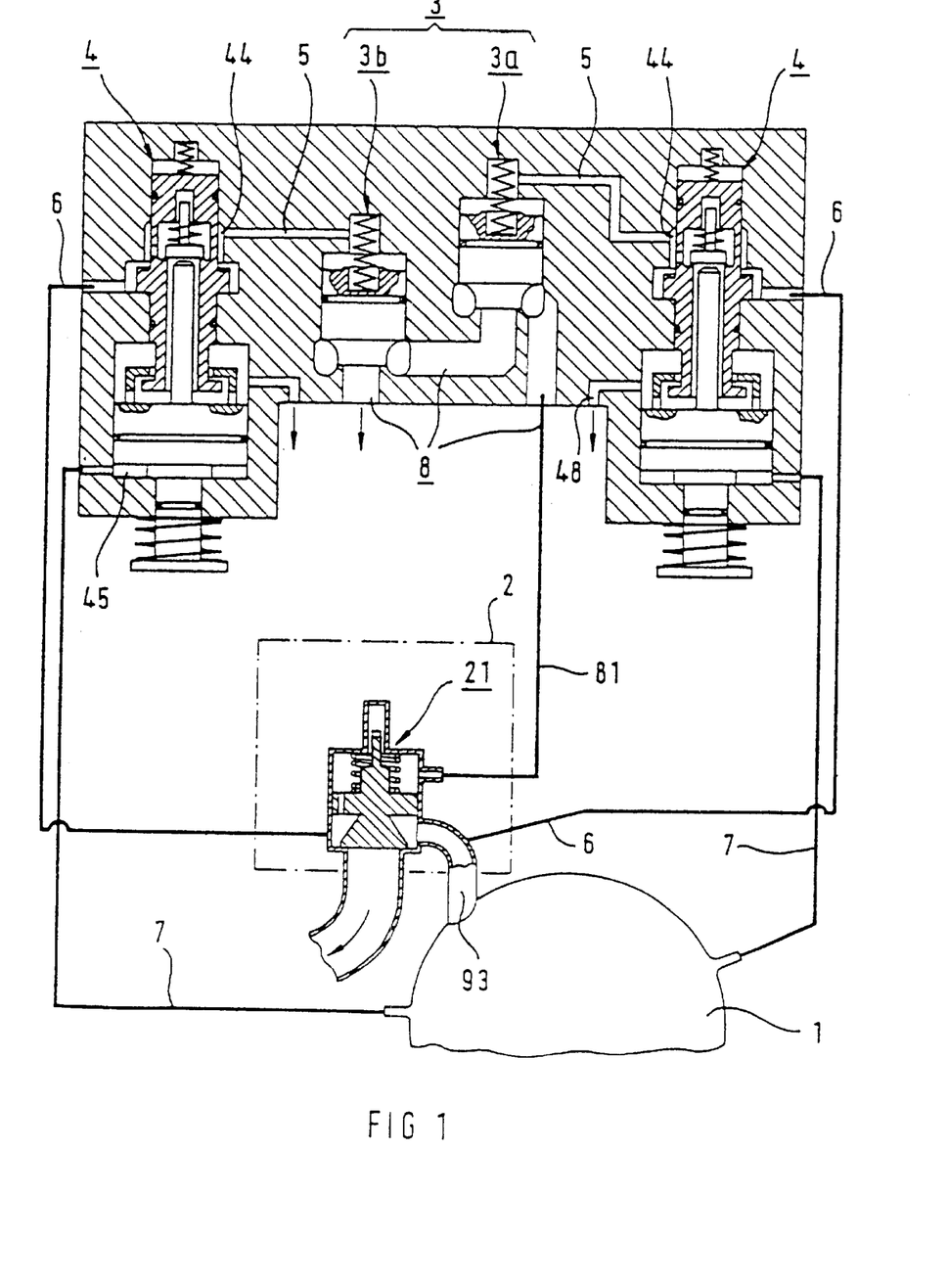
FIG. 1 is a partly sectional, partly diagrammatic view of a spring-loaded tandem pilot valve which operates according to the relief principle, with a safety valve.
Figure 1A:
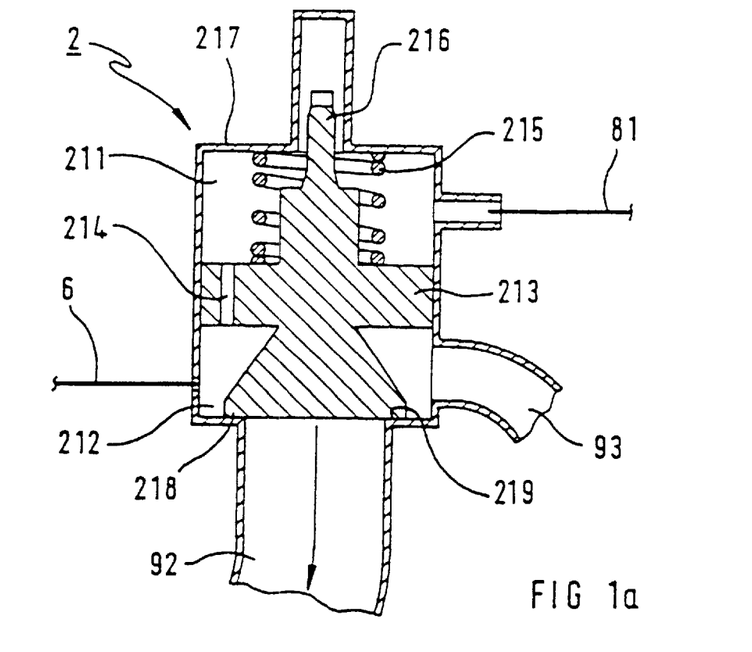
FIG. 1a is an enlarged sectional view of the safety valve.
Figure 1B:
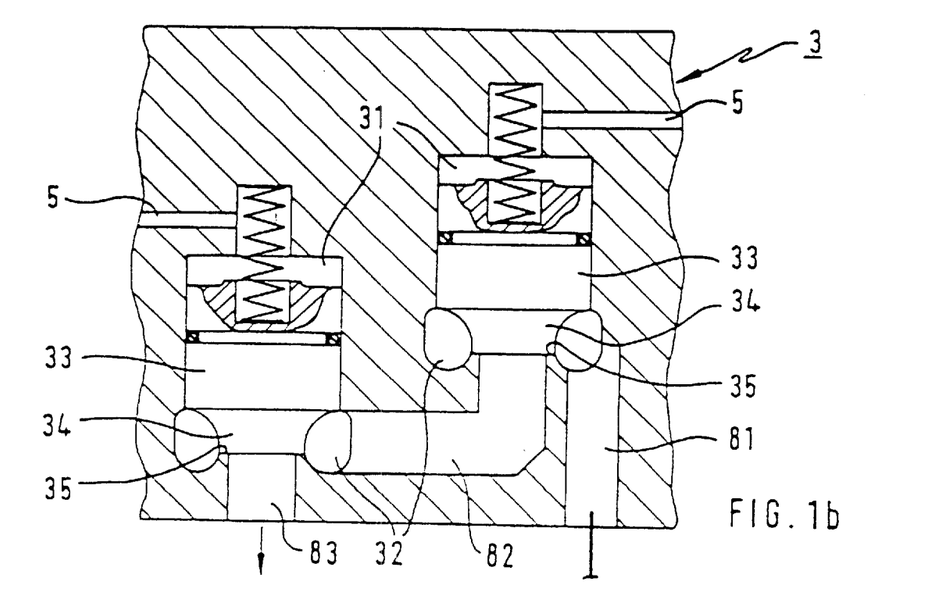
FIG. 1b is an enlarged sectional view of the pilot parts.

Referring now to the figures of the drawing in detail and first, particularly, to FIG. 1 and FIGS. 1a, 1b thereof, there is seen a pilot device for a safety valve 2. The safety valve 2 of the exemplary embodiment serves to relieve the pressure in a (reactor) pressure vessel 1. The safety valve 2 in this exemplary embodiment is a safety valve 21 which operates according to the relief principle (FIG. 1a). To control the safety valve 2, in each case two pilot valves 4 and pilot parts 3 (FIG. 1b) are provided. To make the drawing clearer, the pilot parts 3 and pilot valves 4 are shown on a much larger scale than the safety valve 2. For the same reason, the pressure vessel 1 is only diagrammatically indicated on a scale which is considerably smaller than that used for the safety valve 2.

An assembly in which a safety valve 2 is controlled by in each case two pilot parts 3 and pilot valves 4 is referred to as a "tandem configuration."

The safety valve 21 which operates according to the relief principle is connected to the pressure vessel 1 via a pressure line 93. The pressure line 93 opens out into a lower valve volume 212. The lower valve volume 212 is separated from an upper valve volume 211 (the "control volume" of the valve) by a valve plate 213. The upper valve volume 211 and lower valve volume 213 are in communication with one another via a hole 214 which leads through the valve plate 213. To assist the closure force, a valve spring 215 is arranged above the valve plate 213, one end of which spring rests on the valve plate 213 and the other end of which spring rests against the valve housing wall 217. In the closed position of the valve, the pressure outlet line 92 is closed off by the valve cone 218. The lower end of this valve cone 218 rests on the valve seat 219.

A relief line 81, which is part of a control line 8 of the safety valve 21, connects the upper valve volume 211 to a working port on the bottom volume 32 of a first pilot part 3a, which likewise constitutes a valve. This lower volume 32 is separated from an upper volume 31 of this first pilot part 3a by a pilot-part piston 33, the lower end of which is of frustoconical design. The lower end 34 of the pilot-part piston 33 closes off an intermediate line 82, which as a further part of the control line 8 serves to connect the lower volume 32 of the pilot part 3a to the lower volume 32 of a second pilot part 3b. This pilot part 3b is of the same type as the pilot part 3a. It has a pilot-part piston 33 which separates the lower volume 32 of the pilot part 3b from its upper volume 31. This pilot-part piston 33 likewise has a frustoconical lower end 34. This frustoconical end 34 closes off an outlet line 83 which belongs to the control-line system 8, starts from the lower volume 32 of the pilot part 3b and, at the end of the control line 8, leads to the outer volume of the pilot device or a drain.

The upper volumes 31 of the pilot parts 3a and 3b are connected to the pilot valves 4 via intermediate passages 5.

The control passages 5 open out into a first chamber 44 of the pilot valves 4. This first chamber 44 is connected, via a connection line 6, to either the lower valve volume 212 directly or to the pressure line 93, which likewise opens out into the lower valve volume 212. A second chamber 45 of the pilot valves 4 is connected to the pressure vessel 1 via connection lines 7.

Under normal operating pressure, the safety valve 21, which operates according to the relief principle, is closed, i.e. the valve cone 218 is situated on the cone seat 219. In the control line system 8, the relief line 81 is subjected to pressure. This pressure also acts on the top side of the valve plate 213, so that the valve cone 218 is pressed onto its seat 219. The pressure in line 81 and the upper valve volume 211 is continuously built up as a result of the upper valve volume 211 being in communication with the lower valve volume 212 via the hole 214 in the valve plate 213. Since, in the closed position of the safety valve 21 which operates according to the relief principle, the lower end 34 of the pilot-part piston 33 of the pilot part 3a blocks off the relief line 81 with respect to the intermediate line 82 and therefore also with respect to the outlet line 83, the pressure which has built up in line 81 and the upper valve volume 211 cannot escape and therefore acts on the top side of the valve plate 213. Since the sum of the surface areas which are active for the closure pressure, namely the surface area of the valve plate 213, that of the valve guides 216 situated on the valve plate 213 and that of the valve cone 218, is larger than the surface area which is active for the counter-pressure on the underside of the valve plate 213, the valve cone 218 is pressed onto its valve seat 219. The closed position is supported by the valve spring 215.

The closed position of the safety valve 21, which operates according to the relief principle, can only be reached as a consequence of a pressure build-up in the relief line 81. For this to happen, it is necessary for the relief line 81 to be blocked off with respect to the outlet line 83. The relief line 81 is blocked off from the outlet line 83 in such a manner that the control line system 8 is closed at least by one of the pilot parts 3. In the normal situation, the control line system 8 is closed by both pilot parts 3. In this case, the frusto-conical lower ends 34 of the pilot-part pistons 33 are pressing against a seat 35. As a result, the intermediate line 82 is blocked off from the first line 81 by the first pilot part 3a and the intermediate line 82 is blocked off from the outlet line 83 by the other pilot part 3b. The blocking takes place in such a manner that pressure is applied to the upper volumes 31 of the pilot parts 3 and, as a result, the lower ends 34 of the pilot-part pistons 33 are pressed onto the seats 35.

If the pressure in the pressure vessel then reaches a critical level, the pressure in the upper volumes 31 of the pilot parts 3 is relieved by the pilot valves 4. Since the lower volume 31 of the first pilot part 3a is in communication with the relief line 81 and is therefore exposed to pressure, the pilot-part piston 33 of the first pilot part 3a is pressed upward off its seat 35. The pressure which is present in the relief line 81 can then spread through the intermediate line 82 into the lower volume 32 of the second pilot part 3b. Since the pressure in the upper chamber 31 of the second pilot parts 3b has also been relieved by the pilot valve 4 associated with the pilot part 3b, the pilot-part piston 33 of the second pilot part 3b is pressed upward out of its seat 35. As a result, the outlet line 83 is opened. A connection through which pressure can pass is formed between the upper valve volume 211 of the safety valve 21, which operates according to the relief principle, and the space surrounding the pilot device. As a result, the pressure on the upper valve volume 211 is relieved. The safety valve 21 opens on account of the pressure prevailing in the lower valve volume 212. When the valve 21, which operates according to the relief principle, opens, the valve cone 218 is removed from its cone seat 219, so that a connection is formed between the pressure line 93 and the pressure outlet 92. Medium can escape from the pressure vessel 1 via the pressure line 93 and the pressure outlet line 92, and as a result the pressure in the pressure vessel 1 can be reduced.

If the pressure in the pressure vessel 1 falls below a certain preset level, pressure is applied to the upper volumes 31 of the pilot parts 3 by the pilot valves 4. As a result, the lower ends 34 of the pilot-part pistons 33 are pressed onto the seats 35. Consequently, the passages from the relief line 81 to the intermediate line 82 and from the intermediate line 82 to the outlet line 83 are blocked. A pressure builds up in the upper valve volume 211 and in the first line 81 through the hole 214 in the valve plate 213 of the safety valve 21, which operates according to the relief principle, and this pressure presses the valve cone 218 onto the cone seat 219. The safety valve 21, which operates according to the relief principle, closes.

If—for whatever reason—one of the two pilot parts 3 fails, the control line system 8 is still closed by at least one of the pilot parts 3. As a result, a pressure which presses the valve cone 218 onto its cone seat 219 can build up in the upper valve volume 211.

Figure 2:
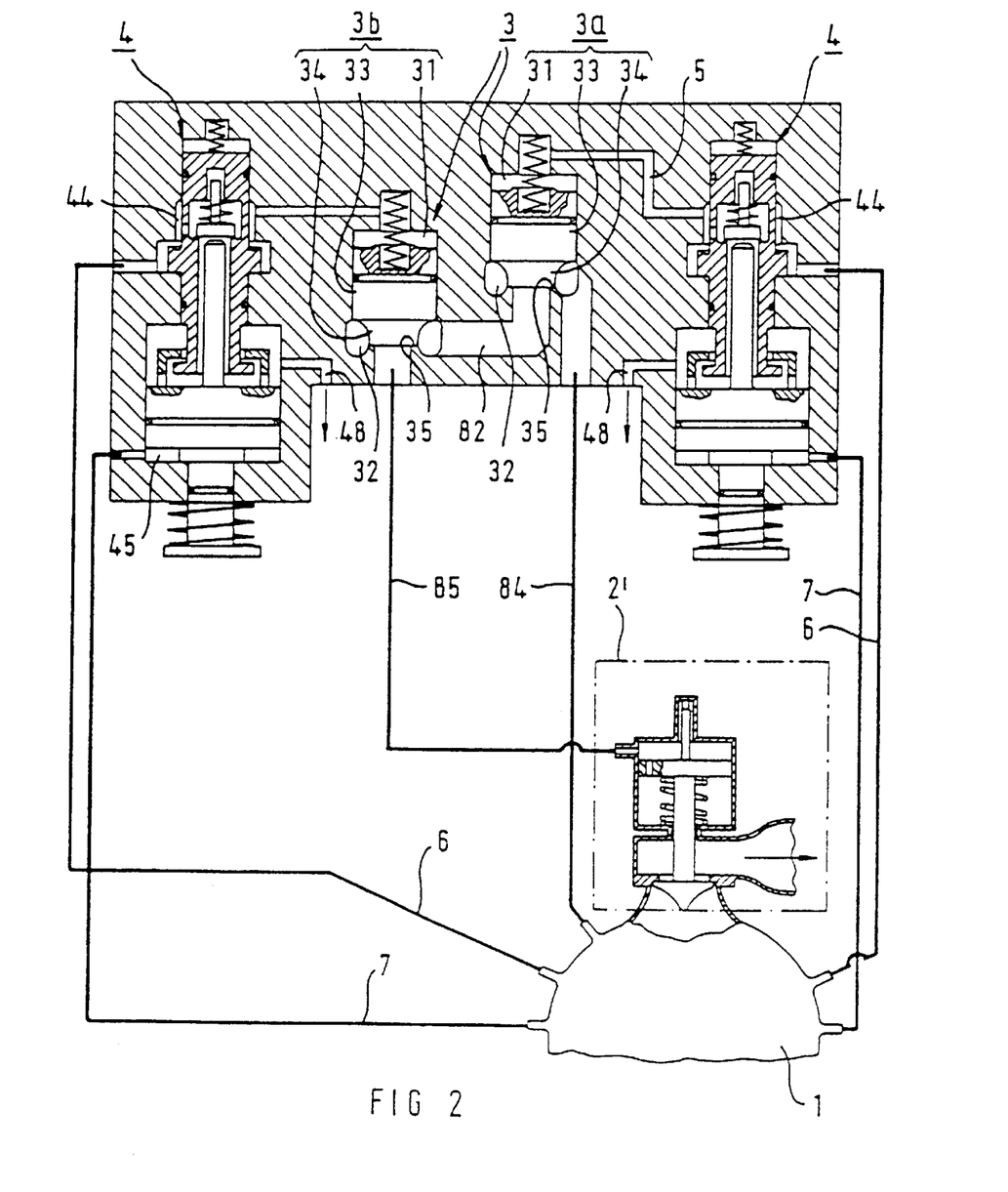
FIG. 2 is a partly sectional, partly diagrammatic view of a spring-loaded tandem pilot valve which operates according to the loading principle.
Figure 2A:
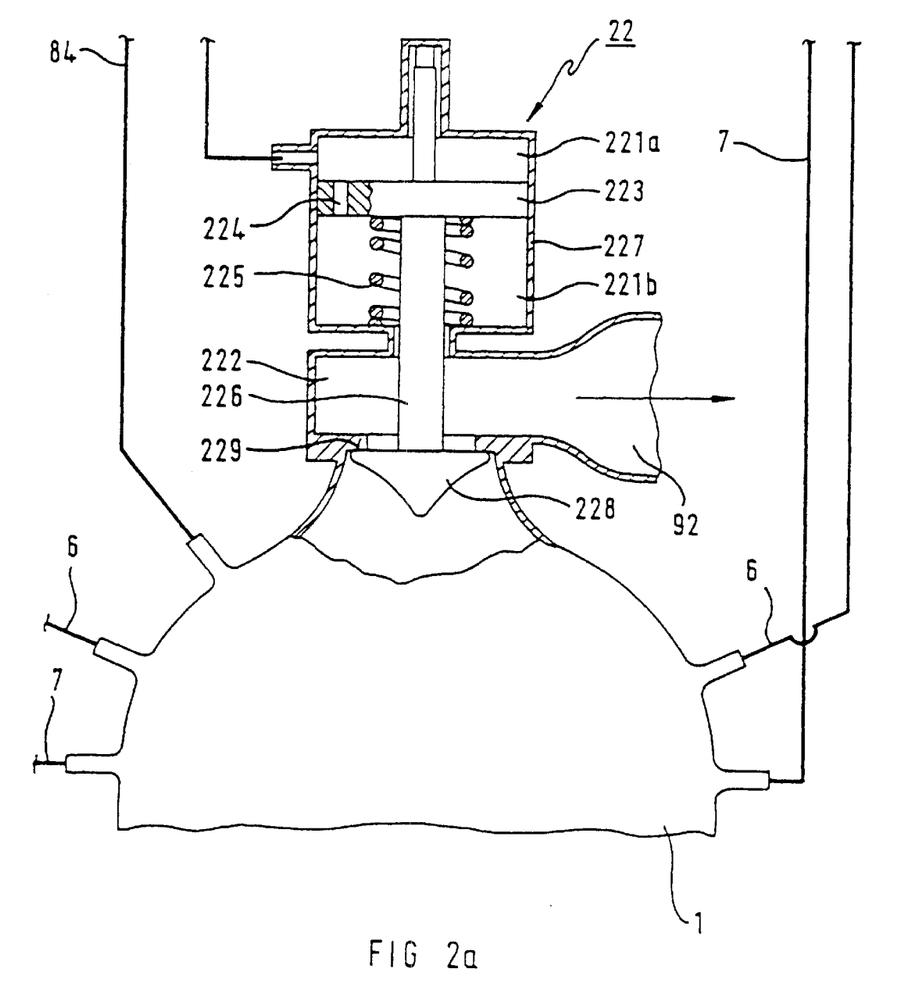
FIG. 2a is an enlarged view of the corresponding safety valve.

FIG. 2 shows a tandem pilot valve arrangement which operates according to the loading principle. On a pressure vessel 1 there is a safety valve 2', this safety valve 2' being a safety valve 22 which operates according to the loading principle (FIG. 2a). This safety valve 22, which operates according to the loading principle, is controlled by two identical pilot parts 3, each of which is connected to a pilot valve 4. The two pilot valves 4 are of identical construction.

For reasons of clarity, the safety valve 22, which operates according to the loading principle, is shown on a larger scale than the pressure vessel 1 and on a smaller scale than the pilot parts 3 and the pilot valves 4.

The safety valve 22, which operates according to the loading principle, is connected to the pressure vessel 1. It has a lower valve volume 222 to which a steam outlet line 92 is connected. In the closed position of the valve, the lower valve volume 222 is closed off from the pressure vessel 1 by a valve cone 228 which is pressed onto its seat 229 by the pressure prevailing in the pressure vessel 1. On the valve side of the valve cone 228, a valve plunger 226 is arranged on said cone, which plunger leads through the lower valve volume 222 into an upper valve volume 221. At the upper end of the valve plunger 226 there is a valve plate 223 which divides the upper valve volume 221 into an upper half-volume 221a and a lower half-volume 221b. The valve plate 223 is provided with a hole 224 through which the upper half-volume 221a is in communication with the lower half-volume 221b. A spring 225 which surrounds the valve plunger 226 is arranged in the lower half-volume 221b, between the underside of the valve plate 223 and the base of the upper valve volume 221. The upper valve volume 221 is separated from the lower valve volume 222 by a constriction in the valve housing wall 227.

The pressure vessel 1 is connected to a lower volume 32 of a first pilot part 3a via a first line 84 which forms part of a control line 8. When the plant is operating normally, i.e. when the safety valve 2 is in its closed position, this lower volume 32 of the first pilot part 3a is closed of from an intermediate line 82, which likewise forms part of the control line 8, by a frustoconical lower end 34 of a pilot-part piston 33, the intermediate line 82 opening out in a lower volume 32 of a second pilot part 3b. The lower volume 32 of the second pilot part 3b has a loading line 85, which likewise forms part of the control line 8 and connects said lower volume 32 to the upper half-volume 221A of the upper valve volume 221. When the plant is operating normally, this loading line 85 is also blocked off from the lower volume of the second pilot part 3b by the frustoconical lower end 34 of a pilot-part piston 33 of the pilot part 3b.

As in FIG. 1, the pilot parts 3 are each connected to a first chamber 44 of a pilot valve 4 via a control passage 5. This first chamber 44 of the pilot valves 4 is in communication with the pressure vessel 1 via a connection line 6. Furthermore, the pilot valves 4 have a second chamber 45 which is likewise connected to the pressure vessel 1, via connection lines 7.

In the normal operating state of the pressure vessel, the safety valve 22, which operates according to the loading principle, is closed. The upper valve volume 221 is free from pressure, as is the loading line 85 which is connected thereto and connects the upper valve volume to the lower volume 32 of the pilot part 3b. The intermediate line 82, which connects the lower volumes 32 of the pilot parts 3a and 3b, is also free from pressure. By contrast, the first line 84, which connects the pressure vessel 1 to the lower volume 32 of the first pilot part 3a, is under the same pressure as the pressure vessel 1. To ensure that the pilot-part piston 33 of the first pilot part 3a is not lifted off its seat 35 by the pressure prevailing in its lower volume 32, pressure is applied to this pilot-part piston 33 in an upper volume 31. Likewise, pressure is applied to the pilot-part piston 33 of the pilot part 3b in an upper volume 31. This pressure stems from a connection of the upper volume 31 of the pilot parts 3 via the control passages 5, the first chambers 44 of the pilot valves 4 and the connection lines 6 to the pressure vessel 1.

If the pressure in the pressure vessel rises beyond a critical level, the pressure in the volume 31 of the pilot parts 3 is relieved by the pilot valve 4. On account of the pressure prevailing in the lower volume 32 of the first pilot parts 3a via the first line 84, the pilot-part piston 33 is pressed upward off its seat 35. As a result, the pressure which is present in the first line 84 and is coming from the pressure vessel 1 can extend into the intermediate line 82 and pressure can be applied to the lower volume 32 of the second pilot part 3b. As a result of this application of pressure, the pilot-part piston 33 of this second pilot part 3b is then pressed upward off its seat 35. As a result, the loading line 85 is opened, so that the pressure can extend further until it reaches the upper half-volume 221a of the upper valve volume 221, where this pressure acts on the valve plate 223 and presses it downward. The valve cone 228 is pressed downward off its cone seat 229 via the valve plunger 226, which is connected to the valve plate 223. The safety valve 22, which operates according to the loading principle, opens. Medium from the pressure vessel 1 then flows into the lower valve volume 222, where it is discharged via the steam outlet line 92. As a result, the pressure in the pressure vessel 1 falls. If the pressure falls below a certain level, pressure is applied to the upper volume 31 of the pilot parts 3 via the pilot valves 4. The frustoconical lower end 34 of the pilot-part piston 33 is pressed onto its seat 35. As a result, the application of pressure to the upper half-volume 221a of the upper valve volume 221 is ceased. Pressure which is still present in the upper half-volume 221a and in the loading line 85 then escapes via the hole 224 into the lower half-volume 221b. As a result of the pressure coming from the pressure vessel 1, the valve cone 228 is pressed back onto its cone seat 229, and the safety valve 22, which operates according to the loading principle, closes.

If—for whatever reason—one of the pilot parts 3 should fail, the control line system 8 is still blocked by a single one of the pilot parts 3. This ensures that even if one pilot part 3 fails, a safety valve 22, which operates according to the loading principle, is returned to the closed position.

Figure 3:
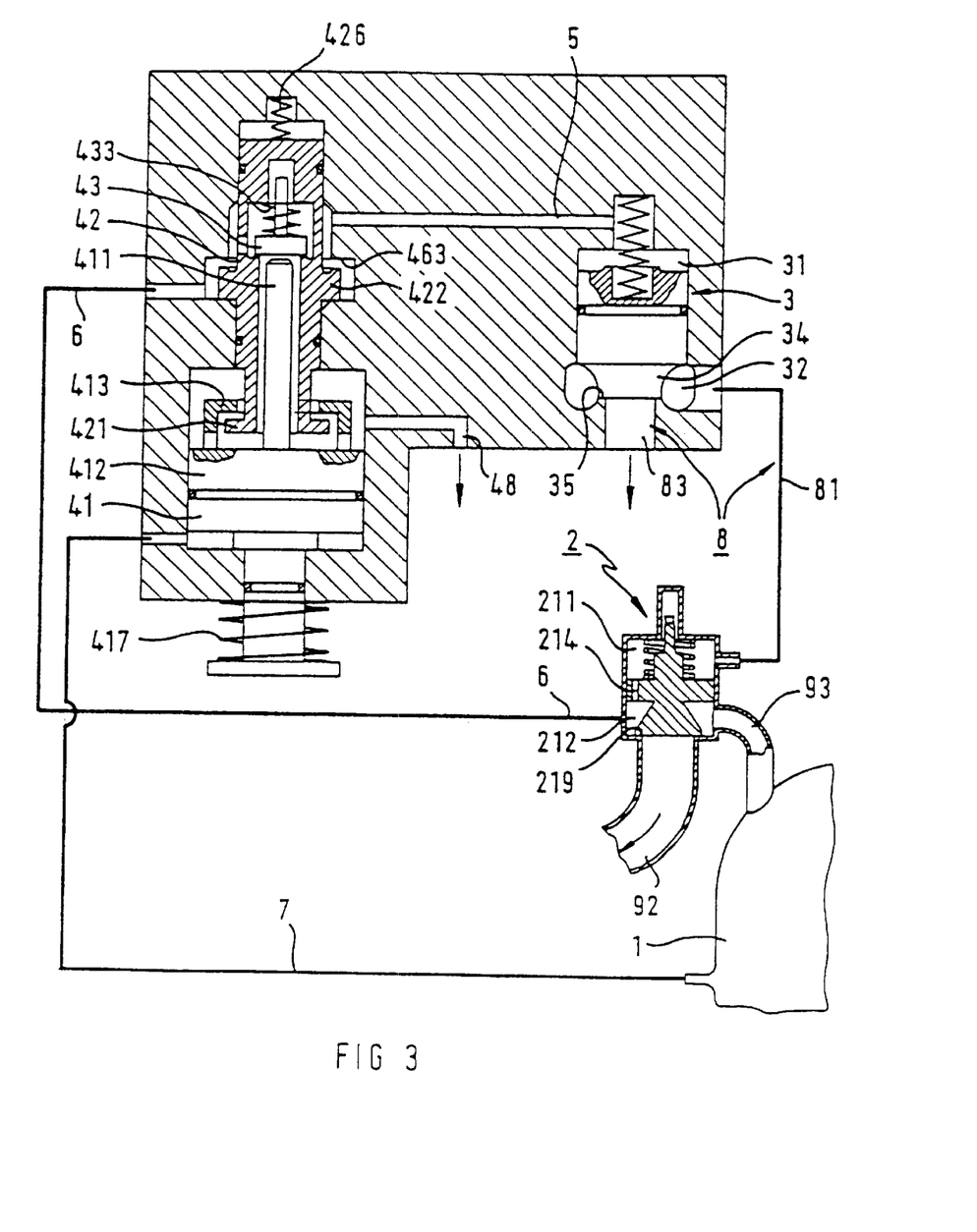
FIG. 3 is a partly sectional, partly diagrammatic view of an individual pilot valve with a safety valve that operates according to the relief principle.

The way in which the pilot parts 3 are controlled by the pilot valves 4 is identical irrespective of whether the safety valve 2 operates according to the loading principle or the relief principle. Since the two pilot parts 3a and 3b and the associated pilot valves 4 are in each case identical, it is sufficient for the design and function of in each case one pilot valve 4 and one pilot part 3 to be explained. FIG. 3 illustrates a pilot valve 4 and a pilot part 3 together with a safety valve 2 which operates according to the relief principle. The figure also shows part of a pressure vessel 1. To make it easier to explain the way in which pilot valve 4 and pilot part 3 function, the series connection of the pilot parts 3 is not illustrated here.

The safety valve 2 is designed as explained with reference to FIG. 1. It is connected to a lower chamber 32 of the pilot part 3 by a relief line 81 which forms part of a control line 8. In the closed position of the safety valve 2, the lower end 34 of the pilot-part piston 33 is situated on the seat 35. As a result, the outlet line 83, which likewise forms part of the control line 8, is blocked off from the lower volume 32 of the pilot part 3 and therefore from the relief line 81. The outlet line 83 leads into a pressure-free space outside the pilot device.

The upper volume 31 of the pilot part 3, which is divided from the lower volume 32 by the pilot-part piston 33, is connected to a first chamber 44 of the pilot valve 4 via an intermediate passage 5. For its part, this first chamber 44 is connected, via a connection line 6, to the lower valve volume 212 of the safety valve 2 and is therefore in communication with the pressure vessel 1 via the pressure line 93. Alternatively, it is also possible for the connection line 6 not to lead via the safety valve 2, but rather to be directly connected to the pressure vessel 1.

Figure 3A:
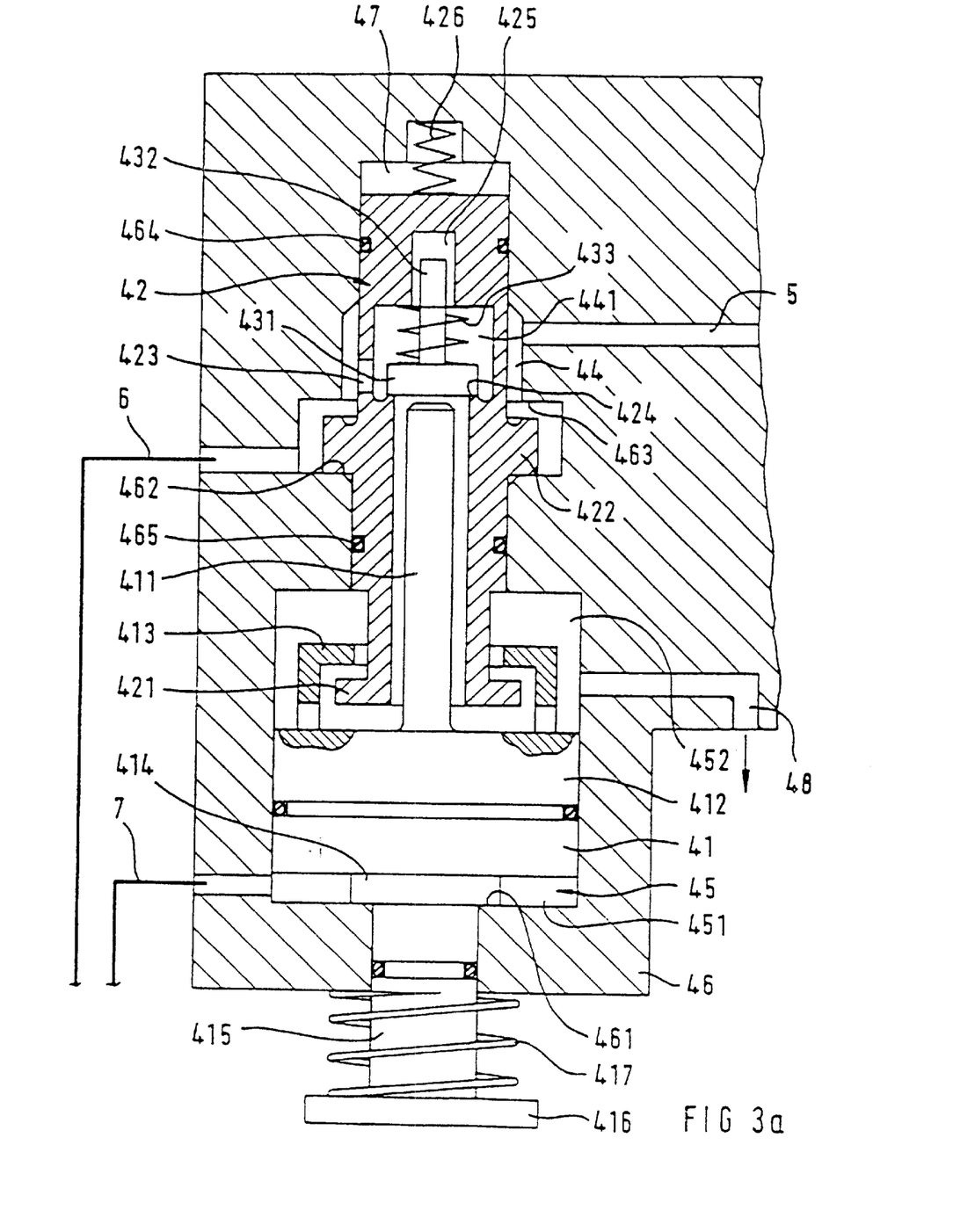
FIG. 3a is an enlarged sectional view of the individual pilot valve in FIG. 3.

The pilot valve 4 has three main components: a pressure-displacement converter 41, a filling cone 42 and a relief cone 43. The converter piston 412 of the pressure-displacement converter 41 is situated in a second chamber 45 of the pilot valve 4. It divides this second chamber 45 into a lower half-volume 451 and an upper half-volume 452. The converter piston 412 is arranged displaceably in the second chamber 45. On its underside there is a first plate 414, the horizontal dimensions of which are smaller than those of the converter piston 412. The lower part of this plate 414 rests on a shoulder 461, which is formed by the inner wall of the housing 46 of the pilot valve 4. This ensures that in the event of displacement of the converter piston 412, the lower half-volume 451 of the second chamber 45 always has a minimum volume. This lower half-volume 451 of the second chamber 45 is connected via a connection line 7 to the pressure vessel 1, which opens out in the region of the minimum volume.

A bolt 415 which leads through the wall of the housing 46 adjoins the underside of the first plate 414. Part of this bolt 415 projects into the space outside the housing 46. At its end there is a second plate 416. A powerful spring 417 is arranged between this plate 416 and the outer wall of the housing 46. The spring force of the spring 417 counteracts the displacement of the converter piston 412 in the upward direction. The spring force is, for example, 13 kN.

A converter plunger 411 is arranged on the top side of the converter piston 412. This converter plunger 411 is guided through a cylindrical extension of the filling cone 42.

If the first plate 414 of the pressure-displacement converter 41 is on the shoulder 461—the position which corresponds to normal operation of the plant—the converter plunger 411 ends just below the relief cone 43.

At its lower end, the cylindrical extension of the filling cone 42 has claws 421. These claws 421 are designed in such a way that they can be acted on by claws 413 arranged on the top side of the converter piston 412.

When the plant is operating normally, a seat stop 422 of the filling cone 42 is situated on a (lower) filling cone seat ("filling cone stop") 462, which is formed by the housing 46. To the side of the filling cone seat 462 is situated the connection of the connection line 6 to the first chamber 44. This first chamber 44 is delimited by the outer wall of the filling cone 42 in the region above the seat stop 422 and the adjacent inner wall of the housing 46. This first chamber 44 is connected to an inner chamber 441 via a passage 423 in the wall of the filling cone 42. This inner chamber 441 is designed as a cavity in the filling cone 42 and surrounds the relief cone 43. In its lower region, this relief cone 43 has a relief cone piston 431, the lower edge of which is arranged, in the normal state of the plant, on a relief cone seat 424 formed by a shoulder of the filling cone 42. Above the relief cone piston 431, the relief cone 43 has a relief cone bolt 432 which, directed upwardly, engages in a cutout 425 in the filling cone 42. A spring 433, a low spring force of which presses the relief cone 43 onto its relief cone seat 424, is arranged between the inner wall of the filling cone 42 on the upper end of the inner chamber 441 and the top side of the relief cone piston 431.

Above the filling cone 42 is a third chamber 47 which is formed by the upper outer wall of the filling cone 42 and the inner wall of the housing 46. Inside this third chamber there is a spring 426 which with a low spring force presses the filling cone 42 against the filling cone stop 462.

In the normal state of the pressure vessel 1, the latter is under a pressure of, for example, 150 bar. This pressure of the pressure vessel 1 is passed on to the lower half-volume 451 of the second chamber 45 via the connection line 7. This pressure acts on the pressure-displacement converter 41 and seeks to press the latter upward. However, the movement of the pressure-displacement converter 41 is prevented by the force from the strong spring 417 driving it downward.

The pressure in the pressure vessel 1 is passed via the connection line 6, through the first chamber 44 and the intermediate passage 5, to the upper volume 31 of the pilot part 3. As a result, the frustoconical lower end 34 of the pilot-part piston 33 is pressed downward onto the seat 35.

The pressure stemming from the pressure vessel also acts acts in the first chamber 44 and the inner chamber 441. However, on the filling cone 42 this pressure has the effect of balancing forces, since the sealing elements 464, 465 (e.g. bellows) above and below the chambers 44 and 441 each seal the same cross section.

When the plant is operating normally, only the relatively weak spring 426 (the spring resistance of bellows would also be possible) presses the filling cone 42, by means of its seat stop 422, onto the stop 462 of the housing 46.

The upper half-volume 452 of the second chamber 45 and the third chamber 47 are free from pressure. If the pressure in the pressure vessel 1 rises, the pressure in those volumes which have been referred to being exposed to pressure therefore rises at the same time and by the same amount. The pressure-displacement converter 41 is pressed upward until its converter plunger 411 comes into contact with the underside of the relief cone piston 431 of the relief cone 43. If the pressure in the pressure vessel 1 rises further, the pressure-displacement converter 41 pushes the filling cone 42 upward via the converter plunger 411 and the relief cone 43. The relief cone piston 431 of the relief cone 43 remains on the relief cone seat 424, since the hydraulic closure force prevailing on account of the pressure in the inner chamber 441 does not allow it to be lifted off the relief cone seat 424. The lifting operation of the filling cone continues as the pressure in the pressure vessel rises further until the upper part of the seat stop 422 of the filling cone is pressed onto the upper filling cone seat 463. As a result of the seat stop 422 being pressed onto the upper filling cone seat 463, the connection between the connection line 6 and the first chamber 44 is interrupted. There is no further pressure compensation between the pressure vessel 1 and the first chamber 44 and the intermediate channel and the upper volume 31 of the pilot part 3. However, the pressure which has prevailed therein hitherto is retained.

Therefore, as the pressure in the pressure vessel 1 rises further, only the pressure in the lower half-volume 451 of the second chamber 45 continues to rise, since this lower half-volume is in communication with the pressure vessel via the connection line 7. At a response pressure of, for example, 176 bar, the pressure-displacement converter 41 is moved further upward and its converter plunger 411 presses the relief cone 43 off its relief cone seat 424 counter to the pressure prevailing in the inner chamber 441. As a result, the pressure which is present in the inner chamber 441, the first chamber 44, the control passage 5 and the upper volume 31 of the pilot part 3 can escape through the interior of the cylindrical extension of the filling cone 42. The pressure is relieved via the upper half-volume 452 of the second chamber 45 through a pilot valve drain 48 which leads out of the pilot device from the upper half-volume 452 of the second chamber 45. Since pressure is then no longer applied to the upper volume 31 of the pilot part 3, the pilot-part piston 33 is lifted upward off its seat 35 by the pressure which is present in the lower chamber 32. As a result, the pressure in the upper valve volume 211 of the safety valve 2 is reduced via the relief line 81 and the outlet line 83. The safety valve 2 opens. When the safety valve 2 opens, the path to the steam outlet line 92 becomes clear. The pressure in the pressure vessel 1 falls. As a result, the pressure in the lower half-volume 451 of the second chamber 45 of the pilot valve 4 is relieved, since pressure compensation takes place through the connection line 7 between this half-volume and the pressure vessel 1. On account of the spring force of the spring 417, the converter piston 412 is pressed downward in accordance with the fall in pressure in the lower-volume 451. The seat stop 422 of the filling cone 42 remains on the (upper) filling cone seat 463. On the underside of the seat stop 422 a hydraulic force acts which presses the filling cone upward counter to its force of gravity. The hydraulic force results from the fact that once again pressure is applied to the volume below the seat stop 422 via the connection line 6, while the first chamber 44 and the inner chamber 441, as before, are free from pressure. Although the hydraulic closure force acting on the filling cone seat 463 is reduced toward the bottom by the hydraulic force acting on the sealing element 465, a resultant force in the closure direction of the filling cone 42 continues to exist, since the cross section of the filling cone seat 463 is larger than the cross section sealed by the sealing element As a result of the pressure-displacement converter 41 and therefore its converter plunger 411 being lowered, the relief cone 43 is lowered back onto the relief cone seat 424, driven by its spring 433. As a result, the first chamber 44, the inner chamber 441, the control passage 5 and the upper volume 31 of the pilot part 3 are separated from the pilot valve drain 48 leading outward. In this state, there is no change in pressure in those volumes.

As the pressure in the pressure vessel 1 falls further to the standard pressure of, for example, 150 bar, the pressure-displacement converter 41 is moved further downward by the spring 417, until ultimately its claws 413 engage in the claws 421 of the filling cone 42 and the latter is detached from its upper filling cone seat 463. At this moment, the pressure of the pressure vessel 1 extends via the connection line 6 into the first chamber 44, the inner chamber 441, the control passage 5 and the upper volume 31 of the pilot part 3. The seat stop 422 of the filling cone 42 is pressed onto the filling cone stop 462. Moreover, the frustoconical lower end 34 of the pilot-part piston 33 is pressed onto its seat 35. As a result, the outlet line 83 is closed off from the relief line 81. Pressure builds up in the relief line 81 and in the upper valve volume 211 via the hole 214, and this pressure presses the valve cone 218 against the cone seat 219. The safety valve 2 closes.

This design leads to the safety valve only opening at a relatively high response pressure of, for example, 176 bar, while it only closes at a relatively low pressure of, for example, 150 bar. This difference in closing pressure is desirable. It effectively prevents alternating opening and closing of the safety valve 2 caused by slight pressure fluctuations.

As explained above with reference to FIGS. 1 and 2, it is possible for a plurality of pilot parts 3 to be connected in series with the associated pilot valves 4. The components of the individual pilot valves are preferably accommodated in a common housing, resulting in a very compact multiple pilot valve, in this case a tandem pilot valve. It is almost irrelevant whether the response pressure of the individual pilot valves is identical or different. To prevent any interference between the two pilot parts of the multiple pilot valve, in this case the tandem pilot valve, it is advisable for the response pressures to be selected so that they differ by a few bar.

We claim:

1. An assembly, comprising:
   a fitting communicating with a control line and being opened by pressure relief via said control line;
   a pilot device having at least two spring-loaded pilot valves each actuating a dedicated pilot part, for opening said fitting by pressure relief via said control line;
   wherein said pilot parts are arranged at said control line and are configured to open said fitting only when all said pilot parts are in a position in which the load on said fitting is relieved, and said pilot parts closing said fitting as soon as a single one of said pilot parts is in a position imposing a load on said fitting.

2. The assembly according to claim 1, wherein said pilot parts contain valves actuated by said pilot valves and are connected in series in said control line.

3. The assembly according to claim 1, wherein said fitting is a safety valve.

4. The assembly according to claim 1, wherein said respective pilot valves and said pilot parts are configured substantially identically.

5. The assembly according to claim 1, which further comprises a filling cone and a relief cone, and wherein at least one of said pilot valves has a pressure-displacement converter mechanically connectible to said filling cone and to said relief cone and being displaced in the same direction by said converter;

wherein said filling cone is displaceably disposed in a first chamber by a relatively low force onto an associated filling cone seat, for blocking off a pressure-carrying connection line opening out into said first chamber from an intermediate passage in said pilot part;

wherein said relief cone is disposed in another chamber of said filling cone, such that said relief cone can be lifted off said relief cone seat by a relatively greater force of said converter and, upon being lifted off said relief cone seat, said relief cone connecting said intermediate passage in said pilot part and said first chamber to a pilot valve drain.

6. The assembly according to claim 5, which comprises a common axis, whereby said pressure-displacement converter, said filling cone, and said relief cone are arranged and can be displaced on said common axis.

7. The assembly according to claim 6, which comprises a converter plunger having a bottom end and an upper end, wherein said pressure-displacement converter is connected to said bottom end of said converter plunger, and said upper end of said converter plunger is disposed beneath and in an immediate vicinity of said relief cone and is displaceable to touch said relief cone, wherein said converter plunger is guided in an extension of said filling cone, and wherein said other chamber having the relief cone seat is formed in an interior of said filling cone.

8. The assembly according to claim 1, wherein said pilot valves and said pilot parts are actuated by a pressure medium from a pressure vessel having an outlet line containing said fitting.

* * * * *

UNITED STATES PATENT AND TRADEMARK OFFICE
CERTIFICATE OF CORRECTION

| | | |
|---|---|---|
| PATENT NO. | : 6,644,346 B1 | Page 1 of 1 |
| APPLICATION NO. | : 09/687971 | |
| DATED | : November 11, 2003 | |
| INVENTOR(S) | : Hermann-Josef Conrads et al. | |

It is certified that error appears in the above-identified patent and that said Letters Patent is hereby corrected as shown below:

On the title page item [30] should read as follows:

Apr. 14, 1998    (DE)    ………. 198 16 463.7

Signed and Sealed this

Seventeenth Day of October, 2006

JON W. DUDAS
*Director of the United States Patent and Trademark Office*